United States Patent Office 3,438,230
Patented Apr. 15, 1969

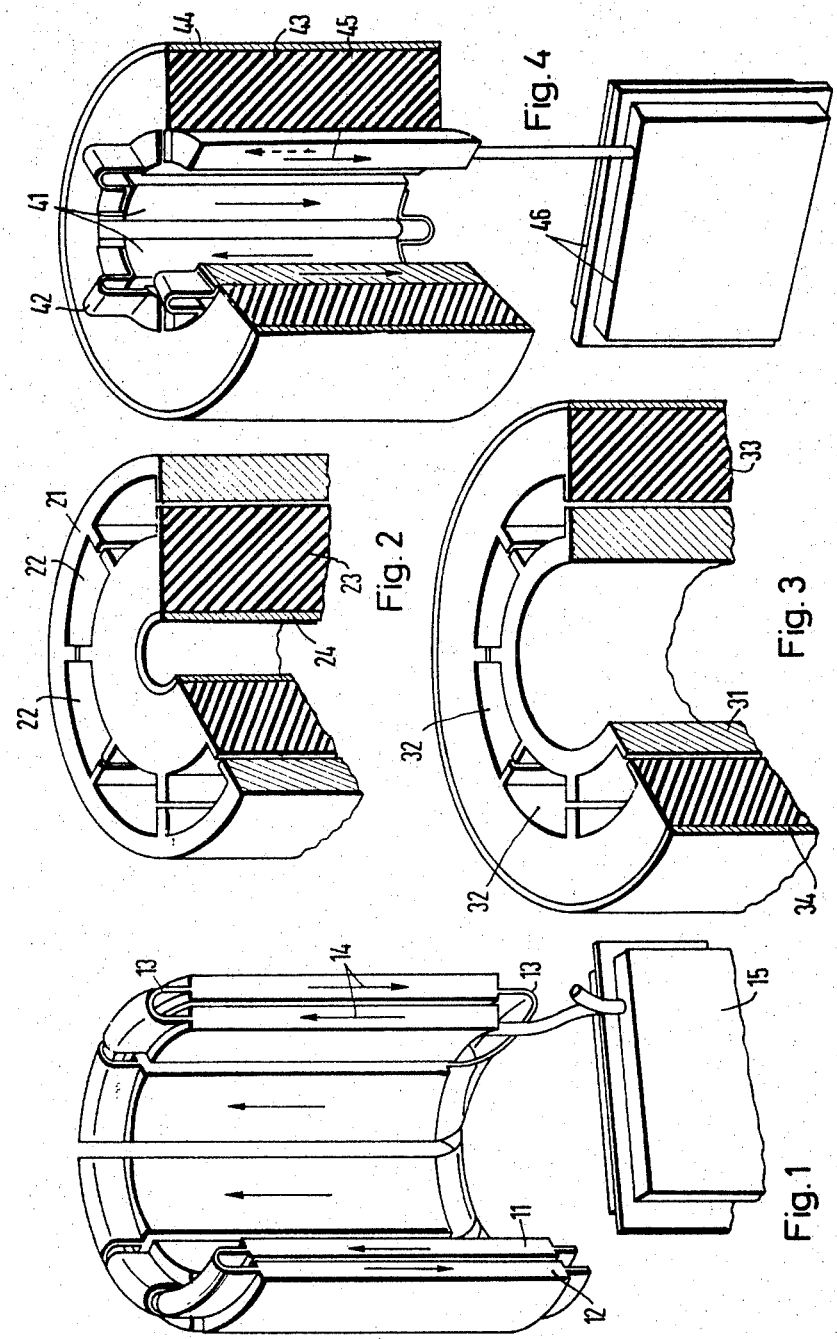

3,438,230
APPARATUS FOR ELECTRODYNAMICALLY
FORMING SOLID BODIES
Helmut Dietz and Friedrich Kuhrt, Nuremberg, Hans-Joachim Lippmann, Boxdorf, and Horst Schenk, Erlangen, Germany, assignors to Siemens Aktiengesellschaft, a corporation of Germany
Filed July 29, 1966, Ser. No. 568,890
Int. Cl. B21d 26/04
U.S. Cl. 72—56                                10 Claims

ABSTRACT OF THE DISCLOSURE

Device for electrodynamically forming workpieces includes a first annulus formed by a plurality of strip-like segments of material having relatively good conductivity, a second annulus of coupling material coaxial to and radially aligned with the first annulus and engageable with the workpiece to be formed, and flexible conductors electrically connecting the segments to one another so that a charge of high-intensity current supplied thereto traverses adjacent ones of the segments in mutually opposite directions for causing resulting mutually repulsive forces in the segments to act through the coupling material so as to form the workpiece.

---

Our invention relates to apparatus for electrodynamically forming solid bodies.

New methods and apparatuses for carrying out these methods have been developed within the past years in the art of metal forming whereby the rate of forming has been increased essentially over the heretofore conventional fabricating methods and apparatuses. These new methods are known as high-speed forming methods. Due to the introduction of these new working methods, fabricating processes have been simplified and improved in many ways. In addition, materials can be formed with these methods which were normally difficult to work in the heretofore conventional manner.

High-speed forming methods and apparatus for carrying out these methods include explosive forming, hydrosparking and magnetic-pulse forming or magneforming. Compression coils, expansion coils and flat coils are employed as the working coils for producing pulsed magnetic fields to form metals according to the so-called magneforming method disclosed for example in Patent No. 2,976,907. With this method and apparatus for carrying out the method, eddy currents are induced in the workpiece by a rapidly varying current which is passed through a primary or work coil, the forming forces being produced by the coaction of the eddy currents with the magnetic field of the working coil. This method and apparatus are limited in use only to metallic bodies and bodies which have a relatively good electrical conductivity.

In the copending application Ser. No. 505,528 of Karl-Georg Günther, filed Oct. 28, 1965, and assigned to the same assignee as that of the instant application, there is disclosed a method and means for electrodynamically forming solid members wherein no eddy currents are induced in the workpiece. The workpiece which is to be formed is surrounded by one or more concentric bifilar and mutually insulated windings of an electrical conductor. The bifilar windings are traversed by high-intensity electrical current in mutually opposite flow directions thereby producing high-intensity repulsive dynamic forces between the correlated winding turns. A coupling material is placed between the workpiece and the bifilar windings in such a manner that the mutually repulsive forces in the bifilar windings act through the coupling material to effect the desired forming of the workpiece. The method and means of this copending application are suitable both for forming electrically conductive and non-conductive materials.

It is an object of our invention to provide a device for electrodynamically forming workpieces which is an improvement over the means described in the aforementioned copending application and which more particularly serves either to compress or expand solid material electrodynamically with the aid of time-variable magnetic fields without employing eddy currents.

With the foregoing and other objects in view, we provide in accordance with our invention a device for electrodynamically forming workpieces comprising a plurality of strip-like segments of relatively good electrically conductive material forming inner and outer coaxially disposed rings each having a peripheral surface adjacent the other and a peripheral surface distant from the other, each segment of the outer ring being located adjacent a segment of the inner ring, one of said distant peripheral surfaces of said segment rings being superimposed by a layer of coupling material engagement by the workpiece that is to be formed, the other of said distant peripheral surfaces of said segment rings being superimposed by a rigid sleeve or jacket and flexible conductors electrically connecting the segments with one another so that the current flow direction in the segments of the outer ring is opposed to the current flow direction in the segments of the inner ring.

The high-intensity currents required for the purpose of the invention of this application are power currents having an intensity of at least 40 kiloamperes (kamp) approximately.

The hereinafter described embodiment of the device constructed in accordance with our invention is suitable both for compressing and expanding rigid members.

Further in accordance with our invention, if it is intended that a rigid workpiece be compressed, then the embodiment of the device of our invention is provided with a layer of coupling material, such as rubber or rubber-like material located between the inner segment ring and the member which is to be formed, and the outer segment ring is connected with a rigid hollow tube or sleeve, for example of steel, which is electrically insulated from the segments.

If an embodiment of a device constructed in accordance with our invention is to be employed for expanding a rigid workpiece, for example a tube, a layer of coupling material, such as rubber or rubber-like material, is then located between the outer segment ring and the workpiece which is to be formed. In that case, the segments of the inner ring are connected with the insulated peripheral surface of a rigid tube such as a steel tube, for example.

In accordance with further features of our invention, our device for forming rigid workpieces electrodynamically with the aid of time-varying magnetic fields without employing secondary currents can be constructed so that individual strip-shaped segments consisting of material having good electrical conductivity and traversed by a charge of high-intensity current can be arranged in one circuit. A layer of coupling material is interposed between the segment rings and the work member which is to be formed. The segments are connected electrically to one another by flexible conductors in such a way that the current flow direction in adjacent segments are mutually opposite.

This device is suitable only for expanding workpieces. The individual segments are thereby traversed by current in alternate directions. Consequently, a large magnetic field is produced in the spaces between the individual segments whereby a transverse force is exerted in the azimuthal direction. The segments deflect this force in the radial direction and thus release the shock waves, which are necessary for expanding the workpiece, into the surrounding coupling material consisting, for example of a rubber cylinder.

Other features which are considered as characteristic for the invention are set forth in the appended claims.

Although the invention as described and illustrated herein is as embodied in the device for electrodynamically forming solid bodies, it is nevertheless not intended to be limited to the details shown, since various modifications and structural changes may be made therein without departing from the spirit of the invention and within the scope and range of equivalence of the claims.

The construction and method of operation of the invention, however, together with additional objects and advantages thereof will be best understood from the following description of specific embodiments when read in connection with the accompanying drawings, in which:

FIG. 1 is a schematic view in perspective, the segments arranged in an inner and an outer ring in accordance with the invention;

FIG. 2 is a fragmentary perspective view partly in section of one embodiment of a holder for the segment rings of FIG. 1, which is employed for compressing a workpiece in accordance with the invention, FIG. 3 is a fragmentary perspective view partly in section of another embodiment of a holder for the segment rings of FIG. 1, which is employed for expanding a workpiece;

FIG. 4 is a perspective schematic view partly in section of an assembled embodiment of the device of the invention wherein the segments are arranged in one ring within a holder.

Referring now to the drawing and first to FIG. 1 thereof, there are shown a plurality of segments 11 of an inner ring, a plurality of segments 12 of an outer ring coaxial to an radially aligned with the inner ring, and flexible conductors 13 connecting alternate inner and outer ring segments in series. The arrows 14 indicate the current flow direction in the individual segments. The terminals for the segment rings are shown at 15.

In FIG. 2, there is shown a holder for receiving the segment rings 11, 12 of FIG. 1 so as to form an embodiment of the device of the invention wherein a rigid tubular workpiece is able to be compressed by the segments of FIG. 1, when the segment rings are inserted suitably in the holder of FIG. 2. An outer jacket or sleeve 21, for example in the form of a steel tube, defines with a ring 23 of coupling material which is elastically yieldable, for example rubber, a plurality of openings 22 therebetween. The tubular workpiece 24, as shown, is inserted in the center of the ring 23 of coupling material. The segments of the outer ring 12 (FIG. 1) are connected with the steel tube 21 (FIG. 2), which is electrically insulated however from the outer segment ring 12 by any suitable conventional insulating coating or layer. The segments of the inner ring 11 (FIG. 1) are movable, however, within the openings 22 of the holder shown in FIG. 2. If a shock-current capacitor (not shown in the drawing) were to be electrically connected with and discharged through the terminals 15 and through the segment rings 11 and 12, a shock wave would then be produced in the segments. As can be clearly seen from the arrows 14 of FIG. 1, the current flow direction in the segments of the outer ring is opposite in direction to the current flow in the segments of the inner ring. The segments are repelled from one another in the radial direction due to the formation of high-intensity magnetic fields between the segment rings. The outer segment ring is prevented from moving radially outwardly by the tubular steel jacket 21. The shock wave is consequently transferred by the inner segment ring through the coupling material which is of rubber, for example, to the tube 24 which is to be formed, and the tube 24 is thereby compressed.

A holder for receiving the segment rings of FIG. 1 that is suitable for expanding a rigid workpiece, such as a tube, is illustrated in FIG. 3. A rigid steel tubular jacket 31 and a coaxial ring 33 of coupling material, such as rubber for example, define between themselves openings 32 that are adapted to receive the segment rings shown in FIG. 1. The tube which is to be expanded is identified by the reference numeral 34. If a shocking capacitor, which is not shown in FIG. 3, were connected and discharged through the terminals 15 and the segment rings 11 and 12, as assembled in the holder of FIG. 3, a shock wave would be produced through the individual segments. The radially outwardly movable segments of the outer ring in the case of the embodiment assembled with the holder of FIG. 3 transfer the shock wave through the coupling material, of rubber for example, and expand the workpiece tube 34.

FIG. 4 is a perspective view of an assembled embodiment of the device of our invention wherein the segments are arranged in a single ring within a holder. The segments of the ring 41 are connected to one another serially by flexible conductors 42, and a ring of coupling material 43 is placed intermediate to the segment ring 41 and a tubular workpiece 44. A current flow direction in each of the individual segments is indicated by the arrows 45. The terminal connector 46 is adapted to connect the segment ring to a non-illustrated shocking capacitor, for example.

The embodiment of FIG. 4 which is suitable only for expanding workpieces, is characterized by the feature of strip-like sgements which are respectively traversed by current in alternate directions. When a non-illustrated shocking capacitor, connected to the terminal 46 and consequently through the flexible conductors 42 to the segments of the ring 41, is discharged, the ensuing current pulse then flows through the individual segments in alternate directions. A high-intensity magnetic field then is produced in the gaps between the individual segments whereby a transverse force in the azimuthal direction is exerted. The segments deflect this force in the radial direction and release the shock wave necessary for expanding the workpiece into the surrounding coupling material of rubber, for example.

A material of good electrical conductivity such as a copper-beryllium alloy is suitable for the segments. The flexible conductors 42 can consist of braided strips of copper or springs of copper-beryllium.

We claim:

1. Device for electrodynamically forming workpieces comprising first annular means formed by a plurality of strip-like segments of material having relatively good electrical conductivity and extending side-by-side in substantially longitudinal direction of said annular means, second annular means of coupling material coaxial to and radially aligned with said first annular means and engageable with a workpiece to be formed, and flexible conductor means electrically connecting said segments to one another so that a charge of high-intensity current supplied thereto traverses adjacent ones of said segments in mutually opposite directions for causing resulting mutually repulsive forces in said segments to act through said coupling material so as to form the workpiece.

2. Device for electrodynamically forming workpieces comprising first annular means formed by a plurality of strip-like segments of material having relatively good electrical conductivity, second annular means of coupling material coaxial to and radially aligned with said first annular means and engageable with a workpiece to be formed, and flexible conductor means electrically connecting said segments to one another so that a charge of high-intensity current supplied thereto traverses adjacent ones of said segments in mutually opposite directions for causing resulting mutually repulsive forces in said segments to act through said coupling material so as to form the workpiece, said first annular means comprising inner and outer coaxially disposed rings of said segments each having a peripheral surface adjacent the other and a peripheral surface distant from the other, each segment of said outer ring being located adjacent a segment of said inner ring, one of said distant peripheral surfaces of said segment rings being superimposed by said second annular means of coupling material, and the other of said distant peripheral surfaces of said segment rings being superimposed by a rigid sleeve member.

3. Electrodynamic forming device according to claim 2, wherein said second annular means comprises a ring of elastically yieldable material and is located radially inwardly of said first annular means.

4. Electrodynamic forming device according to claim 2, wherein said second annular means comprising a ring of elastically yieldable material and is located radially outwardly of said first annular means.

5. Electrodynamic forming device according to claim 2, wherein said rigid sleeve member is formed of steel.

6. Electrodynamic forming device according to claim 2, wherein said coupling material is selected from the group consisting of rubber and rubber-like materials.

7. Electrodynamic forming device according to claim 2, wherein said rigid sleeve member is formed of copper-beryllium.

8. Electrodynamic forming device according to claim 2, wherein said sleeve member is insulated from said segment rings.

9. Device for electrodynamically forming workpieces comprising first annular means formed by a plurality of strip-like segments of material having relatively good electrical conductivity, second annular means of coupling material coaxial to and radially aligned with said first annular means and engageable with a workpiece to be formed, and flexible conductor means electrically connecting said segments to one another so that a charge of high-intensity current supplied thereto traverses adjacent ones of said segments in mutually opposite directions for causing resulting mutually repulsive forces in said segments to act through said coupling material so as to form the workpiece, said flexible conductor means being formed of braided copper strip.

10. Device for electrodynamically forming workpieces comprising first annular means formed by a plurality of strip-like segments of material having relatively good electrical conductivity, second annular means of coupling material coaxial to and radially aligned with said first annular means and engageable with a workpiece to be formed, and flexible conductor means electrically connecting said segments to one another so that a charge of high-intensity current supplied thereto traverses adjacent ones of said segments in mutually opposite directions for causing resulting mutually repulsive forces in said segments to act through said coupling material so as to form the workpiece, said flexible conductor means being in the form of springs of copper-beryllium.

References Cited

UNITED STATES PATENTS

| | | | |
|---|---|---|---|
| 3,149,372 | 9/1964 | Stinger | 72—56 |
| 3,279,228 | 10/1966 | Brower | 72—56 |
| 3,346,914 | 10/1967 | Sandstrom et al. | 72—56 |

RICHARD J. HERBST, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,438,230                                                          April 15, Helmut Dietz et al.

It is certified that error appears in the above identified patent and that said Letters Patent are hereby corrected as shown below:

In the heading to the printed specification, after line 9, insert -- Claims priority, application Germany, August 2, 1965, S 98576 --.

Signed and sealed this 14th day of April 1970.

(SEAL)
Attest:

Edward M. Fletcher, Jr.

Attesting Officer

WILLIAM E. SCHUYLER, J

Commissioner of Paten